(12) United States Patent
O'Reilly

(10) Patent No.: US 9,045,950 B2
(45) Date of Patent: Jun. 2, 2015

(54) LASER ALIGNMENT DEVICE FOR USE WITH A DRILL RIG

(75) Inventor: Jordan O'Reilly, Aitkenvale (AU)

(73) Assignee: PRECISION ALIGNMENT HOLDINGS PTY LTD, Yeppoon (AU)

( * ) Notice: Subject to any disclaimer, the term of this patent is extended or adjusted under 35 U.S.C. 154(b) by 580 days.

(21) Appl. No.: 13/509,376

(22) PCT Filed: Nov. 11, 2009

(86) PCT No.: PCT/AU2009/001467
§ 371 (c)(1),
(2), (4) Date: Jul. 17, 2012

(87) PCT Pub. No.: WO2011/057319
PCT Pub. Date: May 19, 2011

(65) Prior Publication Data
US 2012/0279782 A1 Nov. 8, 2012

(51) Int. Cl.
E21B 7/04 (2006.01)
G01B 11/27 (2006.01)
E21B 15/04 (2006.01)
E21B 7/02 (2006.01)
G01C 15/00 (2006.01)
E21B 47/02 (2006.01)

(52) U.S. Cl.
CPC ............... *E21B 15/04* (2013.01); *E21B 7/022* (2013.01); *E21B 7/025* (2013.01); *G01C 15/004* (2013.01); *G01B 11/27* (2013.01); *E21B 47/02* (2013.01)

(58) Field of Classification Search
CPC ....... E21B 7/022; E21B 7/025; G01C 15/004; G01B 11/27
USPC .................. 33/286, 1 CC, 263, 264, 628, 638
See application file for complete search history.

(56) References Cited

U.S. PATENT DOCUMENTS

| | | | | |
|---|---|---|---|---|
| 3,612,949 A * | 10/1971 | Becraft et al. | ................. | 356/153 |
| 3,891,039 A * | 6/1975 | Lagerstrom | ..................... | 175/40 |
| 4,142,798 A * | 3/1979 | Barbee, Jr. | ..................... | 356/138 |
| 4,586,571 A | 5/1986 | Rajakallio et al. | | |
| 5,383,524 A * | 1/1995 | Rinnemaa | ......................... | 173/1 |
| 6,052,911 A * | 4/2000 | Davis | .............................. | 33/286 |

(Continued)

FOREIGN PATENT DOCUMENTS

| | | |
|---|---|---|
| AU | 1992/210111 | 1/1992 |
| AU | 2003/101052 | 12/2003 |
| AU | 2008/229932 | 10/2008 |

OTHER PUBLICATIONS

International Search Report filed with international application PCT/AU2009/001467.

(Continued)

*Primary Examiner* — Christopher Fulton
(74) *Attorney, Agent, or Firm* — Stein IP LLC

(57) ABSTRACT

A laser alignment device for a drill rig having an elongate drill rod, the laser alignment device including a head unit having at least a pair of laser emitting devices mounted independently to one another thereon, each of the laser devices movable in one plane only and oriented in substantially opposite directions to one another, an attachment means to attach the head unit to a drill rig and a length adjustable assembly to adjust the separation distance between the head unit and the drill rod, wherein the alignment device is used to align at least the azimuth of the drill rod relative to survey marks.

25 Claims, 12 Drawing Sheets

(56) References Cited

U.S. PATENT DOCUMENTS

| | | | |
|---|---|---|---|
| 6,374,507 B1 * | 4/2002 | Lehto | 33/645 |
| 6,708,782 B1 * | 3/2004 | Turney | 175/40 |
| 6,725,551 B1 * | 4/2004 | Sutton | 33/286 |
| 7,194,812 B2 * | 3/2007 | Davis | 33/286 |
| 2003/0052529 A1 | 3/2003 | Hakkinen | |
| 2006/0112581 A1 * | 6/2006 | Nortmann et al. | 33/638 |
| 2008/0230270 A1 * | 9/2008 | Eilo et al. | 175/26 |

OTHER PUBLICATIONS

Written Opinion of the International Searching Authority dated Jan. 20, 2010 in PC/AU2009/001467.

* cited by examiner

LASER ALIGNMENT DEVICE FOR USE WITH A DRILL RIG

CROSS-REFERENCE TO RELATED APPLICATIONS

This application claims the benefit of PCT International Patent Application No. PCT/AU2009/001467, filed Nov. 11, 2009, the disclosure of which is incorporated herein by reference.

BACKGROUND OF THE INVENTION

1. Field of the Invention

The present invention relates to alignment devices and particularly to those which can be used to align drilling rigs to ensure correct drilling azimuth.

2. Description of the Related Art

In mining, whether underground or surface mining (e.g. diamond mining, goldmining etc), once the mine has been formed, exploratory drill holes are typically then formed to try to locate ore bodies. These drill holes can have a length of up to 1 km bur are usually much shorter.

Initially, geologists will determine the likely location of an ore body or seam. The mine geologist will design the mine and the location of the exploratory holes and the surveyors will place survey markers in appropriate locations marking the intended hole positions. The survey markers will comprise a first mark on one wall of the mine and a second mark on an opposed wall of the mine. The markers are usually small reflective squares pinned to the mine wall. A "string line" between the two markers will show exactly the direction that the drilling apparatus will need to drill. This is known technology. For surface mines, a pair of pegs or markers inserted into the ground are typically used.

The direction typically includes the two components "elevation" and the "azimuth". The elevation is the angle to the horizontal at which the drill rod is oriented and the azimuth is the degree or direction about a vertical axis that the drill rod is oriented.

Ensuring the correct "elevation" is usually not a great problem as the drill rig can quite easily be angled upwardly or downwardly to the correct elevation. However, ensuring the correct "azimuth" has been a problem to date and even a small error in the azimuth can cause rejection of the bore hole.

Once the survey markers have been completed, a drill rig is positioned to drill the required core samples. The drill rig is usually a very large self-propelled apparatus. A typical apparatus comprises a wheeled or tractor vehicle which has a forwardly extending boom arm and attached to the boom arm is a drill rig. The drill rig is attached to the boom arm such that it can adopt any required angle (in FIGS. 1 and 2 the drill rig is pointing downwardly).

This type of apparatus is well-known and there are many different sizes and types of such apparatus, such as that illustrated in FIG. 3 for example which is an example of a skid-steered self propelled rig.

Once the drill rig is roughly in position (determined by the survey markers), it needs to be very accurately adjusted to the survey markers. Once the adjustment is complete, the drill rig is secured in position and this is usually done by bolting the drill rig to the mine floor using a known type of feed frame positioner. For larger rigs, the weight of the rig can be sufficient to maintain the position.

The drill rig is then turned on to drill the required hole.

The present invention is directed to a laser unit device that can be used to very accurately correctly adjust the azimuth of the rig prior to bolting (securing) the rig into position. Conventionally, string lines are used to align the rig prior to securement of the rig into position. That is, a string line is stretched between the survey markers on the opposed walls of the mine shaft. The apparatus is then positioned as close as possible to the string line and is aligned with the string line (that is the drill rig is aligned to be parallel with the string line to get the correct azimuth). Because of the size and shape of the apparatus, it is not possible to place the apparatus against the string line and usually the apparatus will be some distance away from the string line. For a "normal" sized apparatus, the apparatus will still be about 1 m away from the string line but a larger apparatus, this can be between 3 to 4 m from the string line. A measuring tape is then used to accurately measure the distance between the front and the rear of the apparatus and the string line to ensure that the apparatus is exactly parallel with the string line such that when a hole is drilled, the hole will be at the correct azimuth.

In practice, it is difficult to obtain the level of accuracy that is demanded by the geologists using this known technique of string lines and measuring tapes. Once a pilot hole is collared, and it reaches its first survey mark (normally at approximately 5 to 15 meters) a survey tool is then inserted into the drilled hole. This survey tool normally provides a reading of both the elevation and the azimuth of the pilot hole. The driller then checks this against the hole plans and if not exactly correct, the hole will need to be redone.

The cost of drilling each hole can be many thousands of dollars and it is not unknown for the cost to be about $100,000 per hole. A drilling contractor is not paid for a "rejected" hole. In the present specification, the term "drill rig" is not intended to be limiting and includes any type of drill or surface rig adapted to drill a hole in any type of mine including a surface or underground mine.

It will be clearly understood that, if a prior art publication is referred to herein, this reference does not constitute an admission that the publication forms part of the common general knowledge in the art in Australia or in any other country.

SUMMARY OF THE INVENTION

The present invention is directed to an adjustable hanging rack, which may at least partially overcome at least one of the abovementioned disadvantages or provide the consumer with a useful or commercial choice.

With the foregoing in view, the present invention in one broad form, resides broadly in a laser alignment device for use with a drill rig having an elongate drill rod, the laser alignment device including a head unit having at least one laser emitting devices, the laser devices movable in one plane only, an attachment means to attach the head unit to a drill rig and an adjustable assembly to adjust the positioning of the head unit relative to the drill rod, wherein the alignment device is used to align at least the azimuth of the drill rod relative to survey marks.

In an alternative, the invention resides in a laser alignment device for use with a drill rig having an elongate drill rod, the laser alignment device including a head unit having at least one laser emitting device, the laser device movable in one plane only, an attachment means to attach the head unit to a drill rig and an adjustable assembly to adjust the positioning of the head unit relative to the drill rod, wherein the alignment device is used to align at least the yaw of the drill rod relative to survey marks.

The least one laser emitting device may be a rotating or static laser capable of projecting a laser beam. Where provided in a rotating configuration, there will typically be only a single laser in each device.

However, multiple lasers may be provided with different purposes, for example, one rotating laser to align the drill rod azimuth and a second for the inclination or angle.

In a preferred embodiment, the laser alignment device will align the pitch and the yaw of the drill rod, or put another way, the inclination and azimuth of the drill rod. Normally, a laser device will be used to align the azimuth or yaw of a drill rod relative to survey marks to ensure that the drill rod is on the correct heading. In addition or in the alternative, bearing devices may be used once a laser beam device has established the alignment.

An inclinometer or clinometer may be used to ensure that the drill rod has the correct inclination or tilt angle.

The device of the present invention can be used in underground situations or above ground, surface situations.

With the foregoing in view, the present invention in a second form, resides broadly in a laser alignment device for use with a drill rig having an elongate drill rod, the laser alignment device including a head unit having at least a pair of laser emitting devices mounted independently to one another thereon, each of the laser devices movable in one plane only and oriented in substantially opposite directions to one another, an attachment means to attach the head unit to a drill rig and a length adjustable assembly to adjust the separation distance between the head unit and the drill rod, wherein the alignment device is used to align at least the azimuth of the drill rod relative to survey marks.

Typically, the lasers will be used to align or adjust the drill rod to the correct elevation or angle as well as azimuth.

As discussed above, it is typically difficult to obtain the level of accuracy of alignment of the drill that is demanded by the geologists and surveyors using the known technique of string lines and measuring tapes. The present invention obviates the need for string lines and droppers and measuring tapes and increases the accuracy of the alignment of the drill rig and thereby the precision of the holes which is drilled.

Preferably the alignment of the drill rig takes place prior to securing the drilling rig in position to drill the hole.

The drill rig in relation to which the device of the present invention is used normally includes a pair of parallel steel feed rails. A carriage is provided which normally slides relative to the rails.

The device of the present invention will normally be attached to the feed rails although it may be attached to any portion of the drill rig. Any mechanism of attachment may be used but the preferred form of attachment is a secure attachment but one which is also easily removeable as the device will normally be removed prior to commencement of the drilling.

Preferred methods of attachment include pin and slot or clamping arrangements but most preferred is a magnetic attachment. A magnetic attachment increase utility of the device as the device can be attached to any metal portion of the drill rig according to the preference the user.

The device will typically be temporarily attached to the drill rig during the alignment phase of the operation of preparing the drill rig for use and will be removed prior to operation of the drill rig. The device will normally remain in place until after the drill rig has been secured in position to limit the chance that the drill rig moves accidentally during the fixing process and to check the alignment of the drill rig.

The device of the present invention includes a head unit. The head unit typically mounts the pair of opposed laser pointing devices in a removeable manner. Alternatively, the head unit may mount a single rotating laser device.

Any laser pointing devices may be used. Each of the laser pointing devices are typically held by a laser holding means. The laser holding means are typically attached relative to one another. Each laser pointing device can be moved relative to one another via a hinge or pivot or the like extending through both.

Each laser holding means will typically clamp or receive the laser pointing devices in a threaded engagement.

Each laser holding means is preferably provided with a finger tab extending at an angle to the holding means. These finger tabs typically allow each laser to be moved so to point to the survey marks during the alignment process.

The laser holding means may be "sandwiched" between a backing plate and a front plate. Each of the plates and typically the laser holding means itself will be provided with at least one magnetic strip. The respective magnetic strips will preferably function to magnetically clamp the laser holding means to hold the laser holding means in position once aligned with the survey marks or pegs. A pair of arcuate openings may be provided through the front plate through which the finger tabs extend.

Although the abovementioned magnetic means is preferred, any releasable attachment means can be used. Importantly, each of the laser devices move only in a plane which is substantially vertical, such that the laser pointing devices can move up and down only and not side to side. The head unit will therefore also be parallel to the foot portion.

The attachment means of the head unit is preferably associated with attachment means to attach the head unit relative to the drill rig.

Preferably an actuable electromagnet attachment will be used. The attachment means will also typically be length adjustable to adjust the distance between the drill rig in general and the drill rod in particular and the head unit.

The length adjustment means will typically include a rod or arm assembly which is length adjustable. Located at one end of the arm assembly will normally be the head unit and at the opposite end will be a foot to attach the arm assembly to the drill rig. The arm assembly may be length adjustable in any manner including telescopically or through the provision of a number of arm portions which are attachable relative to one another.

There is also typically an ability to move the head unit upwardly and downwardly relative to the rig.

There may also be a "remote control" variation. To explain, sometimes, the drilling rigs are operated by a single person. Larger rigs are medium-sized having a control cabin to operate the boom arm and various other components. As the laser unit is attached to the drill rig, it may become difficult for a sole operator to (a) operate the entire drill rig from the cabin while at the same time (b) needing to leave the cabin constantly keep check on the laser unit. Therefore, a remote-control laser unit where the lasers might be attached to some form of motor or other type of driving mechanism to adjust the lasers and where the telescopic arm can be extended and retracted by remote-control may be provided. The laser unit could then be operated from the cabin.

A further option is to have an alarm (which could be a light) which lights up when the lasers are correctly aligned. To do so, a reflective strip may be placed on the survey marker and if the laser beam is correctly aligned, the laser beam will bounce off the reflective strip and back to a sensor provided on the laser unit which would then activate the alarm when the laser is correctly aligned. An audio alarm may be provided although a mine is a very noisy environment and a visual alarm is probably of most benefit. A further option is to have a digital inclinometer attached to the laser unit (typically to the telescopic rod). This can then allow the correct elevation or inclination of the drill rig to be quickly determined, and together with the two lasers (to determine the azimuth), the drill rig can be correctly orientated. By having the inclinometer attached to the laser unit, it can also be removed prior to operation of the drill rig.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
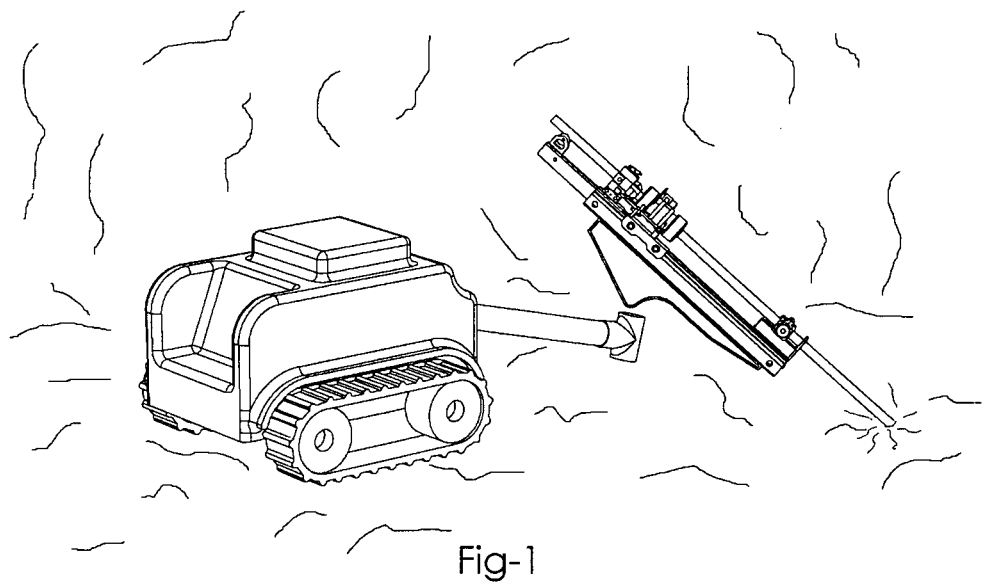
FIG. 1 is a perspective photograph of a conventional boom operated drill rig in operation.
Figure 2:
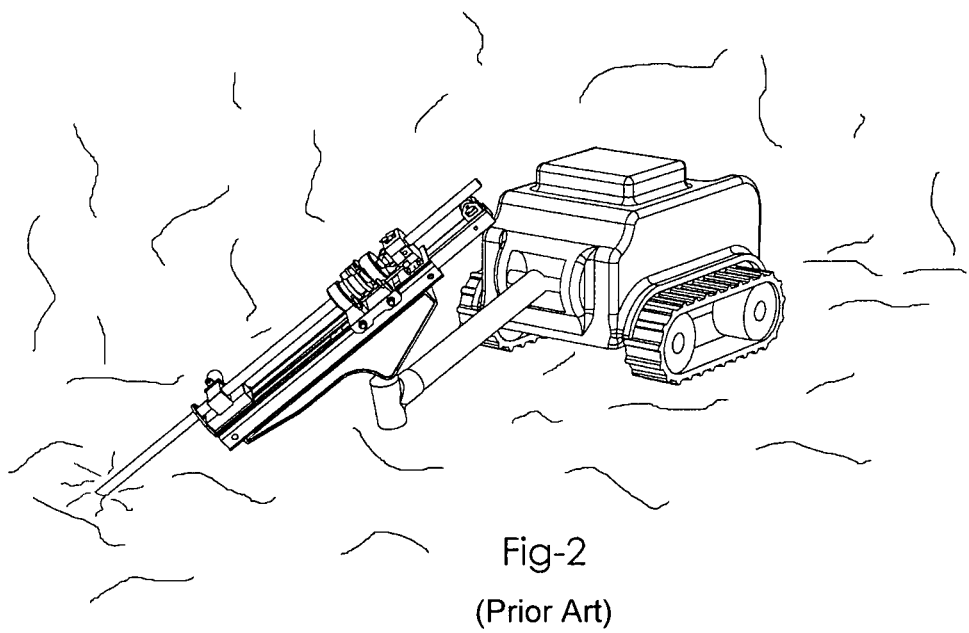
FIG. 2 is a perspective photograph of the drill rig illustrated in FIG. 1 from an alternative angle.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

According to a preferred embodiment, a laser device for use with a drilling rig and a drill rig with the device attached, are provided.

Figure 3:
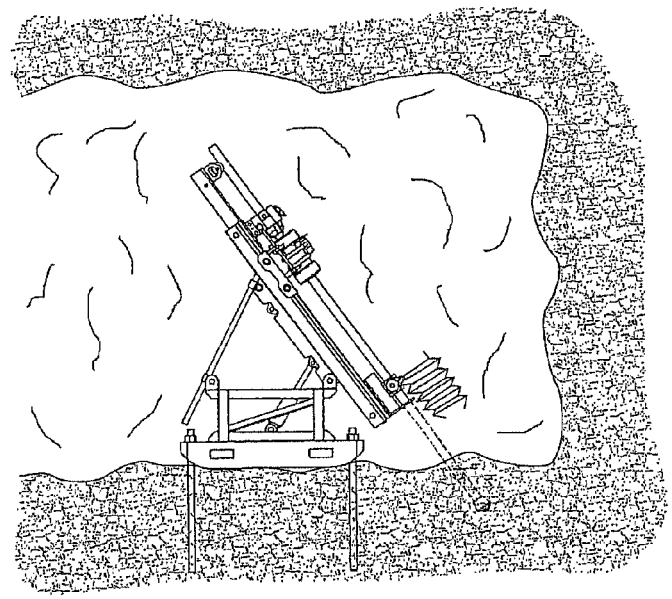
FIG. 3 is a side elevation view of a conventional skid-based drill rig in the installed configuration and anchored to the floor.

A conventional drill rig is illustrated in FIG. 3. The drilling rig itself is of a commercial type and basically comprises a pair of parallel steel feed rails 10 which will typically have a length of between 1.5 m up to 6 m. A carriage 11 slides over the top of each feed rail, and can reciprocate between the retracted position illustrated above and an extended position where the carriage has been moved to the front of the feed rails 10. A hydraulic ram 12 powers the carriage between its positions. On top of the carriage is a high speed hydraulic rotating apparatus 13. The rotating apparatus will typically rotate at speeds of between 1000-10,000 rpm. A drill rod (not illustrated) passes into the front opening of the rotating apparatus and is rotated by the rotating apparatus. In a front part of the drill rig is a "centraliser" 14 through which the rods pass and the function of the centraliser is to keep the rods aligned and to minimise "wobble". A hydraulic piston 15 is associated with the centraliser. The piston extends to lock the drill rod when the drill rod has stopped rotating.

Figure 5:
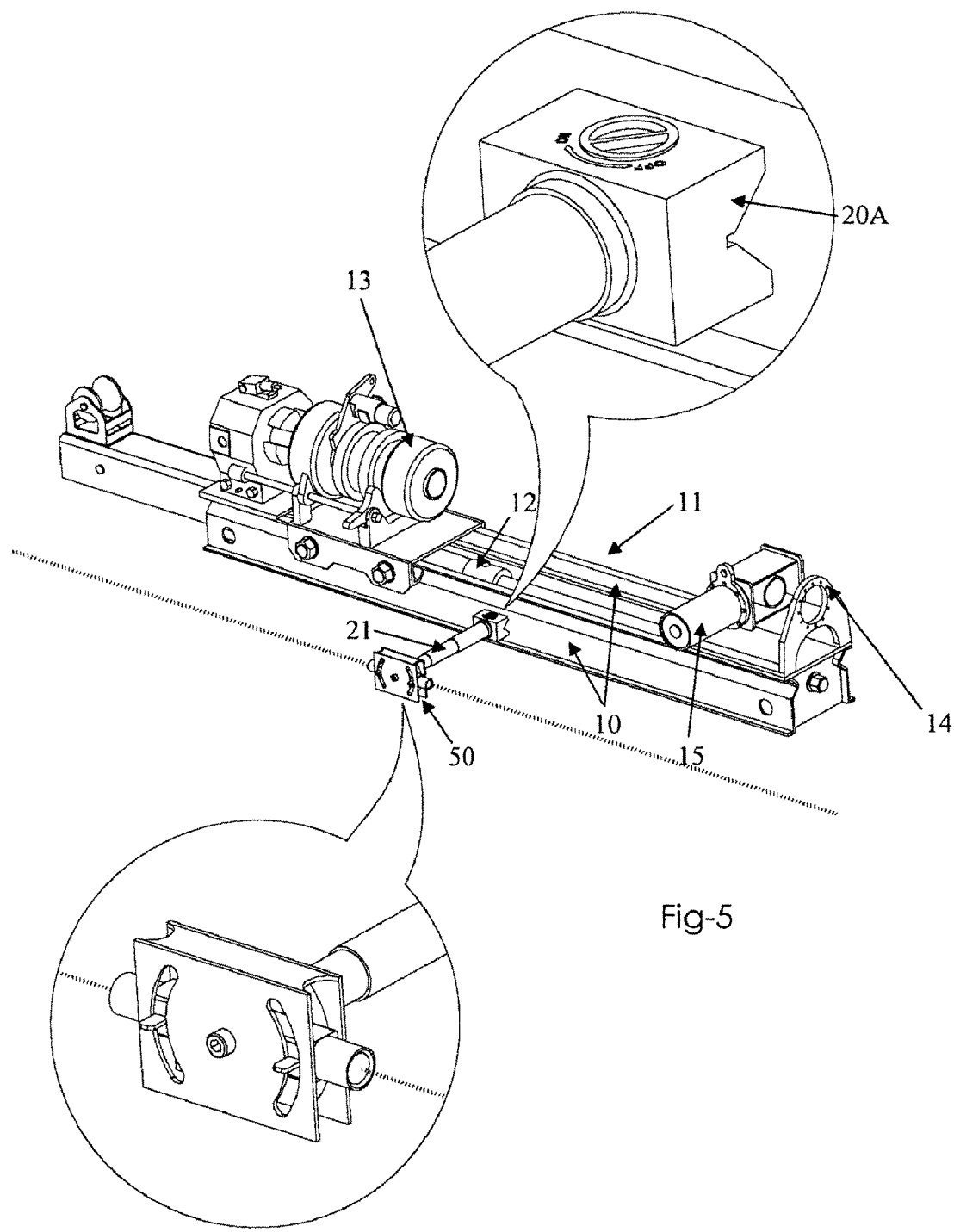
FIG. 5 is a perspective view of a drill rig with a laser alignment device according to a first embodiment temporarily attached to the drill rig.
Figure 6:
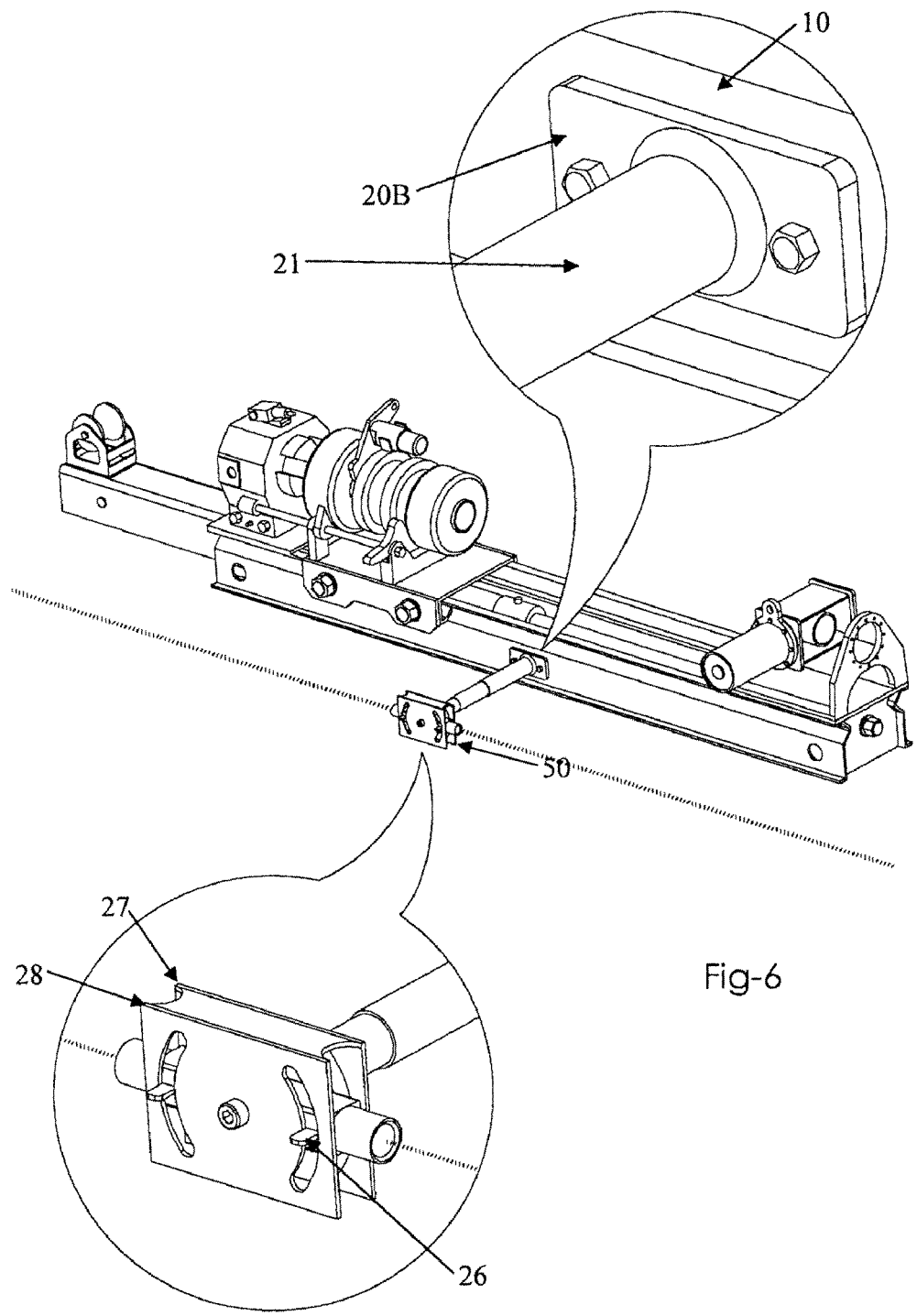
FIG. 6 is a perspective view of a drill rig with a laser alignment device according to a second embodiment temporarily attached to the drill rig.

In FIG. 5 and FIG. 6, the drill rig is exactly the same but the laser unit is slightly different in how the laser unit is attached to the drill rig.

Figure 7:
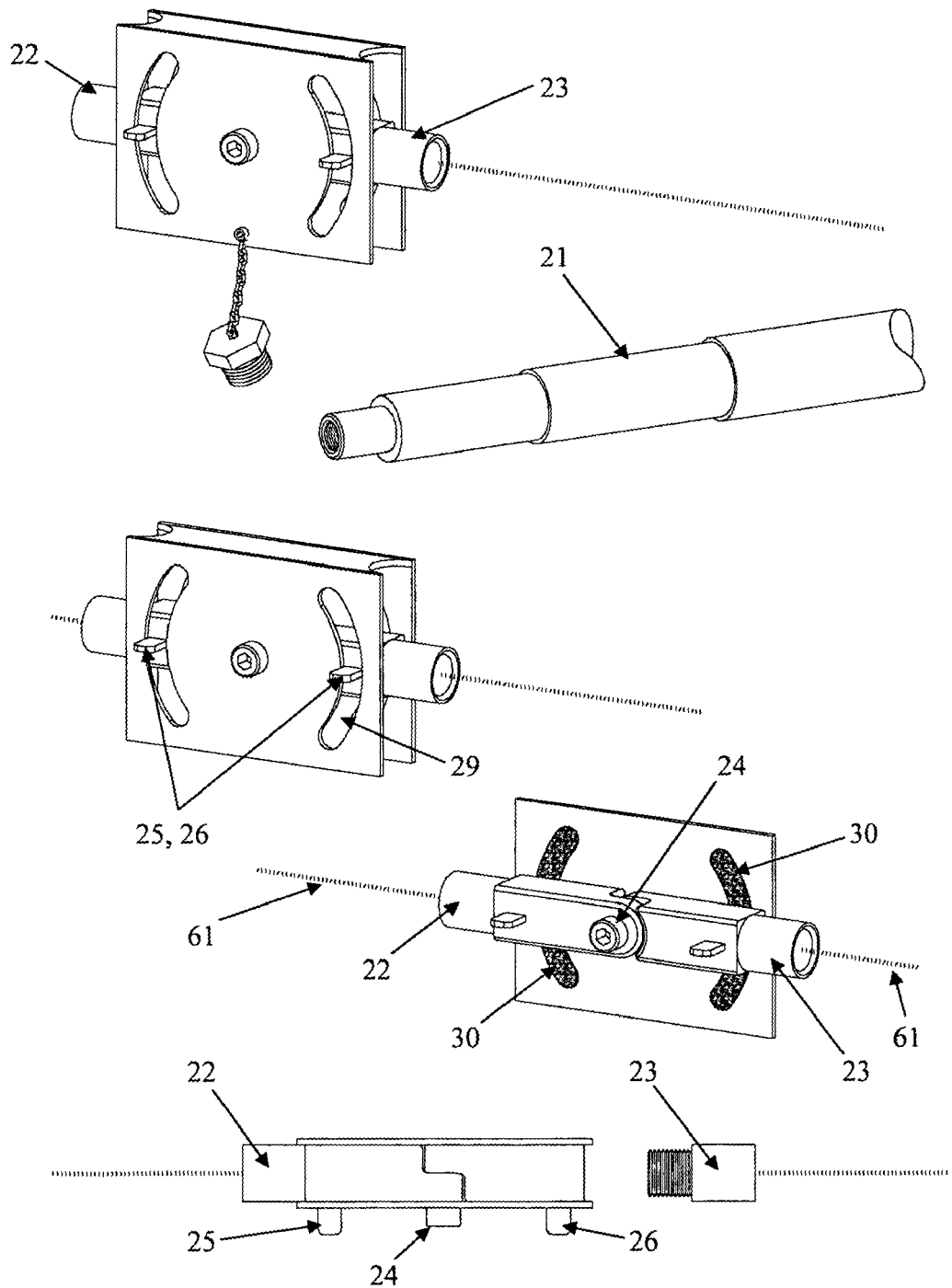
FIG. 7 is a group of views illustrating a device and components thereof according to a preferred embodiment.
Figure 8:
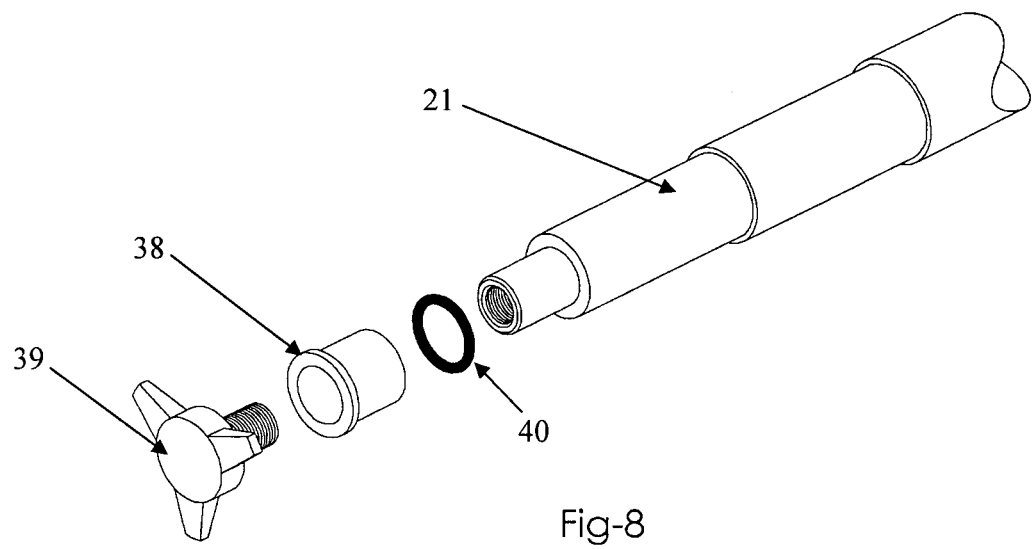
FIG. 8 is an exploded perspective view of an alternative attachment mechanism for the device of the present invention.
Figure 9:
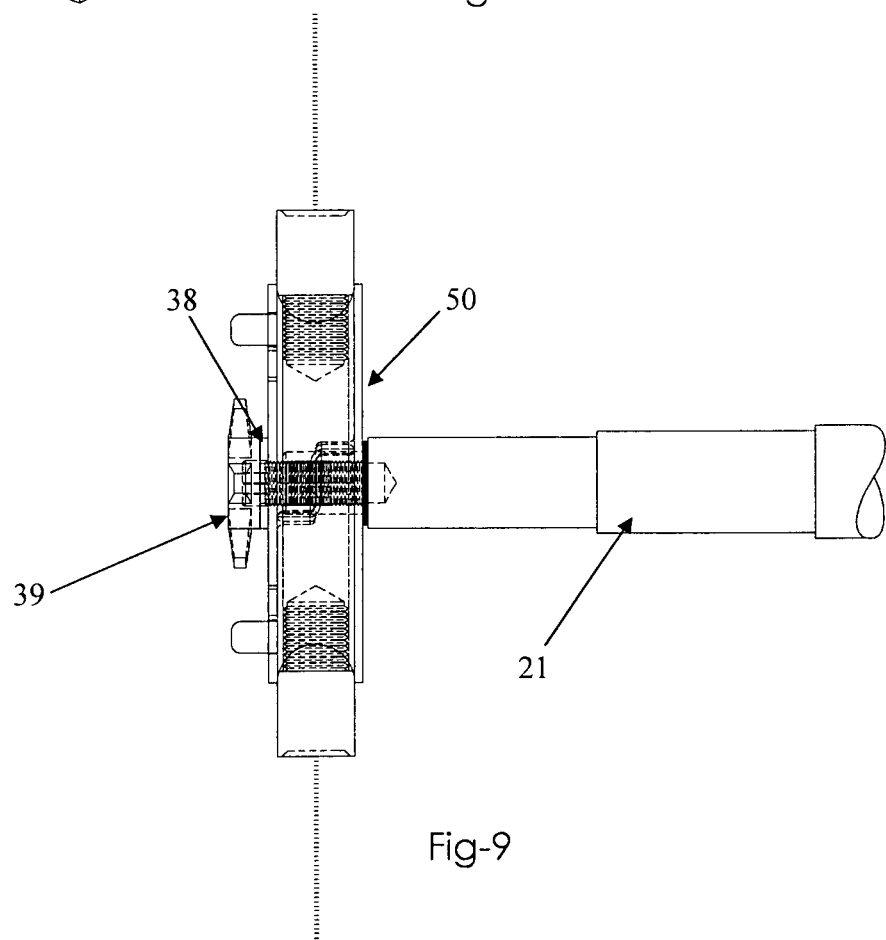
FIG. 9 is a side view of the attachment mechanism illustrated in FIG. 8 in the assembled condition.

Turning now to the laser unit, the various parts are illustrated in FIG. 7.

Basically, the laser unit is temporarily attached to the drill rig during the alignment process and is then removed prior to operation of the drill. Usually, the laser unit will also remain in place as the drill rig is secured in position just in case there is any inadvertent movement during the securing process. Once the rig is secured, the laser unit is removed and the drilling begins.

It is envisaged that the laser unit will be a separate device that can be attached to any commercial type of drilling rig. Therefore, the inventor believes that a magnetic attachment of the laser unit to the rig will be most versatile as this means that the laser unit can simply be magnetically clamped to any commercial rig. It also allows the laser unit to be clamped at any suitable position on the rig.

In practice, it is envisaged that in most circumstances, the laser unit will be attached to one of the feed frames of the drilling rig this being illustrated in FIG. 5 and FIG. 6. The feed frames are made of steel.

FIG. 5 best illustrates the attachment of the laser unit. According to an embodiment illustrated generally by 20A, the laser unit has a base member 20 in which is positioned a strong magnet. A switch is positioned on the base unit and turning the switch causes the strong magnet to turn inside the base member between a magnetic clamping position and a free position where the entire laser unit can be removed. The invention advises that this type of device is known.

FIG. 6 illustrates an alternative attachment 20B of the laser unit which does not use the magnet. Instead, a more conventional fastener arrangement is used. A disadvantage with this alternative attachment is that it does require fasteners or something equivalent to be welded or otherwise attached to the feed frames which can result in projections that can form "snagging points" which is somewhat undesirable.

While a magnetic attachment is desirable, other forms of attachments may also be used such as temporary clamps, a pin and slot arrangement, fasteners, possibly the use of straps and the like. The inventor also does not see any reason to limit exactly where the laser unit is attached to the drill rig. In practice, the attachment will most probably be on the feed frame but this need not be so.

A rod 21 extends outwardly from the mounting plate or mounting block. The rod in the particular embodiment is length adjustable and this can be done by making the rod telescopic. The length of the rod should be sufficient to allow the lasers to align with the survey marks on the mine shaft wall.

As a typical drill rig can be placed no closer than about 1 m to the "string lines" which are presently in use, it is considered that the rod should at least the extendable to about 1 m. For the smaller drilling rigs, the rod should be extendable from at least 20 cm up to 1.5 m and for the larger drilling rigs the rod may need to be longer such as between 1.5 m up to 4 m.

Usually two rod designs will be used, one being telescopic for the smaller units and therefore being extendable between 20 cm up to 1.5 m and a second rod design which can extend between 1.5 m up to 4 m and which can be used for the larger units.

Attached to the end of the rod are two oppositely pointing lasers. An advantage of the present invention is that two lasers 22, 23 (see FIG. 7) are used which point in the opposite direction. Each laser can be commercially available laser can be screwed into a laser holder. Therefore, there will be two laser holders as well.

The laser holders are attached to each other by a fastener 24 and importantly each holder (and therefore each laser) can hinge or pivot relative to each other.

Each laser holder is provided with a finger tab 25, 26. This enables each laser to be gripped and moved depending on the survey markers. Each laser holder is also provided with a magnetic strip.

The laser holders are "sandwiched" between a backing plate 27 (see for instance, FIG. 6 and which can be made of thin metal or plastic) and a front plate 28. The backing plate also contains magnetic strips (see FIG. 7). These magnetic strips will magnetically clamp to the magnetic strip on each laser holder. In this manner, once a particular laser holder has been aligned with a survey mark, it will be held in place by the magnetic strip 30 on the backing plate attaching to the magnetic strip on the laser holder. The front plate 28 is provided with a pair of arcuate openings 29 through which the finger tabs 25, 26 extend and allowing rotation of the lasers 22, 23.

Figure 10:
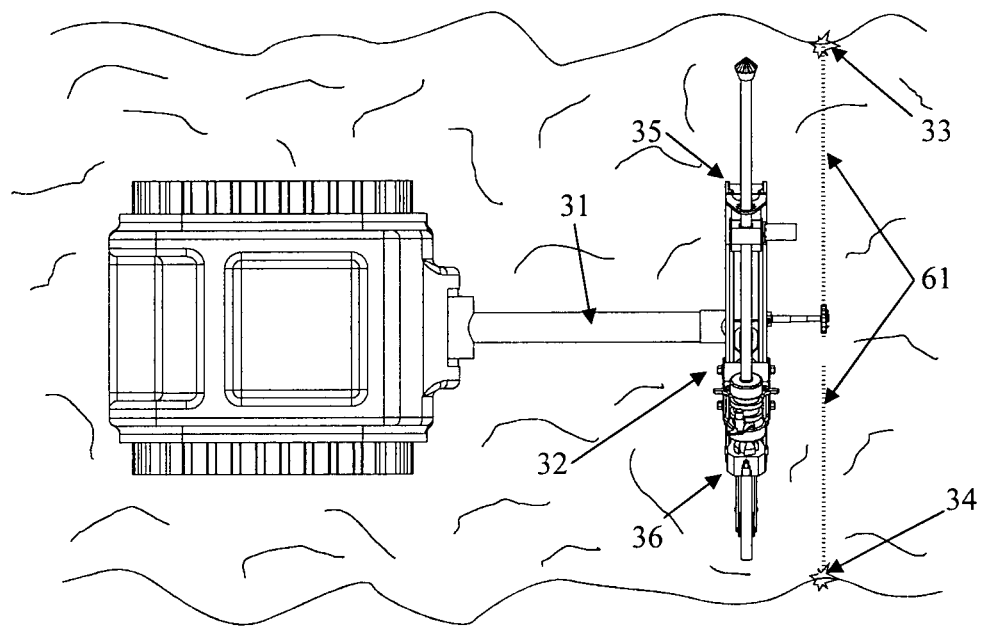
FIG. 10 is a schematic top view showing the alignment of a drilling rig using the present invention.
Figure 11:
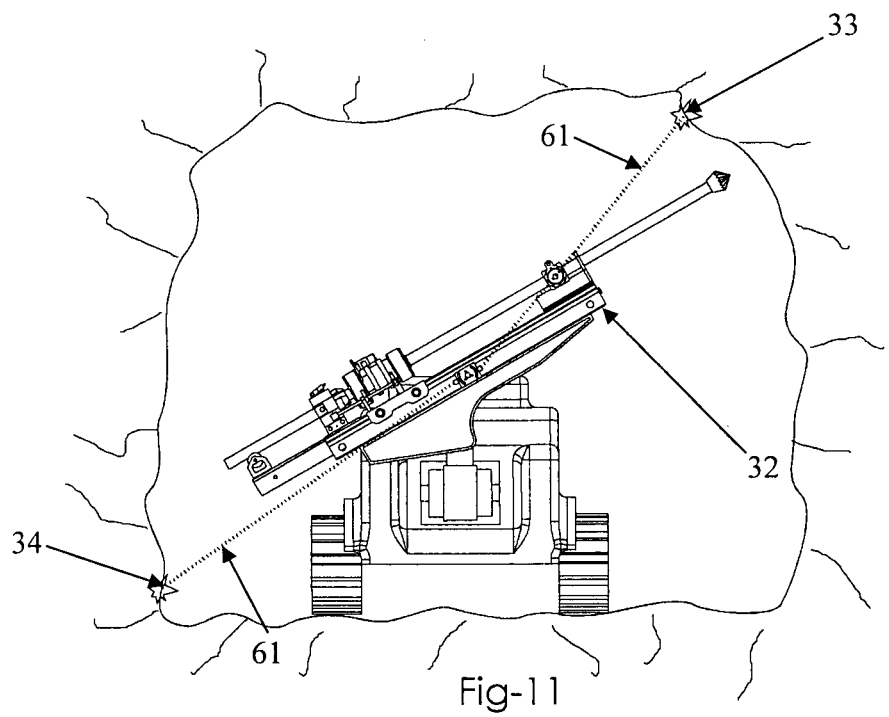
FIG. 11 is a schematic side view of the arrangement illustrated in FIG. 12.
Figure 12:
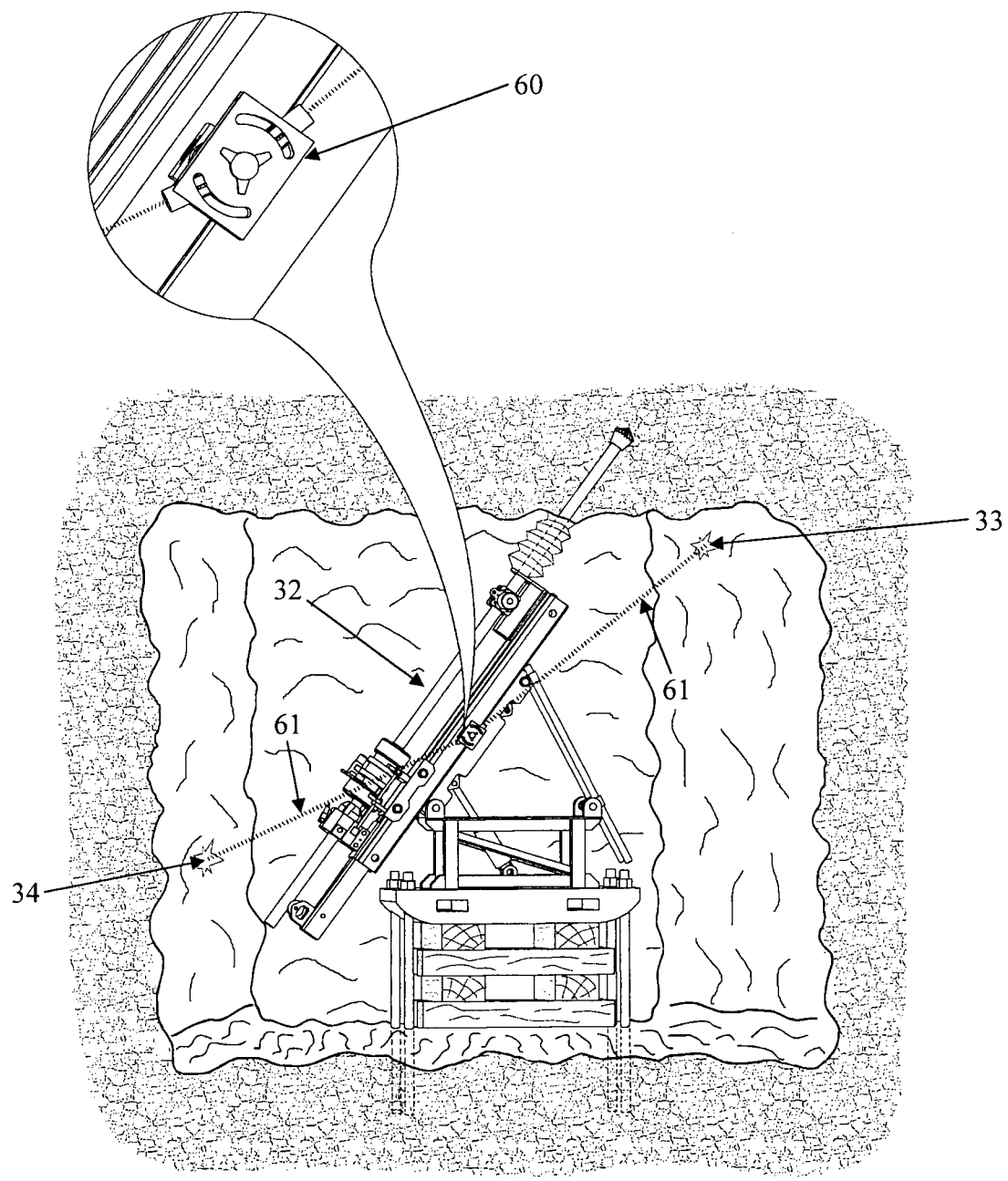
FIG. 12 is a schematic perspective view of a drilling rig with the device according to a preferred embodiment attached and aligned.

The advantage of the "twin" lasers may be better illustrated with reference to FIGS. 10 and 11 which are rough schematic views. FIG. 10 is a top view looking down on the apparatus and what can be seen is the self-propelled wheeled or tractor vehicle 30, the boom arm 31 and the drilling rig 32. Also shown in FIG. 10 and in FIG. 11 are the two markers 33 and 34. In the side view (FIG. 11), it can be seen that one of the markers (e.g. 33) is in an upper part of the mine wall while the other marker (34) is at the bottom of the mine wall. This is not unusual, but if using string lines, it becomes very difficult to try to perfectly align the drill rig with the string line.

When using the twin lasers, (see particularly FIG. 11), the front laser can be pivoted upwardly to target the upper marker 33 while the rear laser can be pivoted downwardly to target the lower marker 34. When looking at this in plan (FIG. 10) it looks like a straight line but when looking at this in side view (FIG. 11) it can be seen that the two lasers are at an angle relative to each other. Importantly however the lasers still project a "straight" line when viewed in plan (FIG. 10) and this allows the drill rig 34 to be aligned with the lasers to be perfectly parallel thereto. That is, the front of the drill rig 35 and the rear of the drill rig 36 must be exactly the same distance away from the imaginary line formed by the lasers (see FIG. 10). Any deviation may result in the formed hole being rejected. This deviation can be seen as the "azimuth" and therefore the main function of the laser unit is to ensure that there is no deviation in the azimuth that is required.

The "elevation" can be seen as the angle of the drill rig from the horizontal (e.g. the mine floor) this can be easily adjusted by the apparatus. Thus, when looking at FIG. 11, it can be seen that the drilling rig has not yet been correctly "elevated" such that the drilling rig will ultimately drill a hole next to the upper marker 33. Once the all important "azimuth" of the drill rig has been aligned, the drill rig is secured (e.g. bolted to the floor) and then the elevation of the drill rig can be adjusted using the hydraulics of the apparatus.

For this reason, it is quite important that the lasers can only move up and down but cannot move from side to side. Any side to side movement can compromise the correct azimuth which is undesirable. It is also quite important that the lasers are exactly parallel to the drilling rig when the laser unit is attached thereto. The inventor advises that the drilling rigs are very precise and that the feed frames on the drilling rig are exactly parallel to the drilling rods. Thus, attachment of the laser unit to a feed frame will result in the lasers projecting a laser beam which is exactly parallel to the drilling rods. It also seems important in the manufacture of the laser units that the laser holders are exactly parallel to the magnetic mounting block wall mounting frame.

Figure 4:
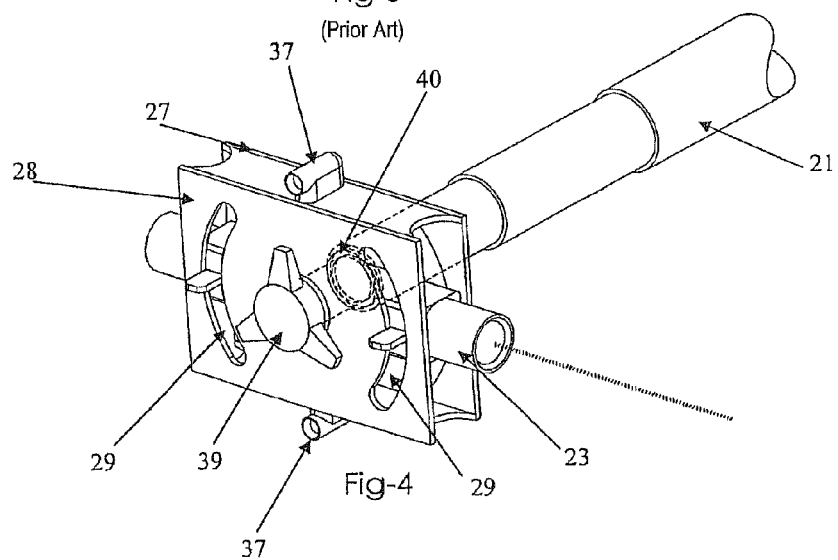
FIG. 4 is a schematic isometric view of a device of the present invention according to a preferred embodiment.

FIG. 4 is an isometric view of the head unit 50 of a laser device according to a further preferred embodiment including lights 37 which are activated once the correct azimuth is reached. Also illustrated is an alternative method of connecting the head unit to the rod for simple and easy attachment and removal.

The head unit 50 is provided with a bore therethrough. A collar 38 is located in the bore. The rod 21 of the device is provided with an internally threaded end portion into which a threaded fastener 39 is received. The threaded fastener 39 extends through the collar 38 located in the head unit 50 and attaches the head unit 50 to the rod 21 quickly and easily. An o-ring 40 or similar is provided to minimize unwanted rotation of the head unit 50 relative to the rod 21.

Figure 13:
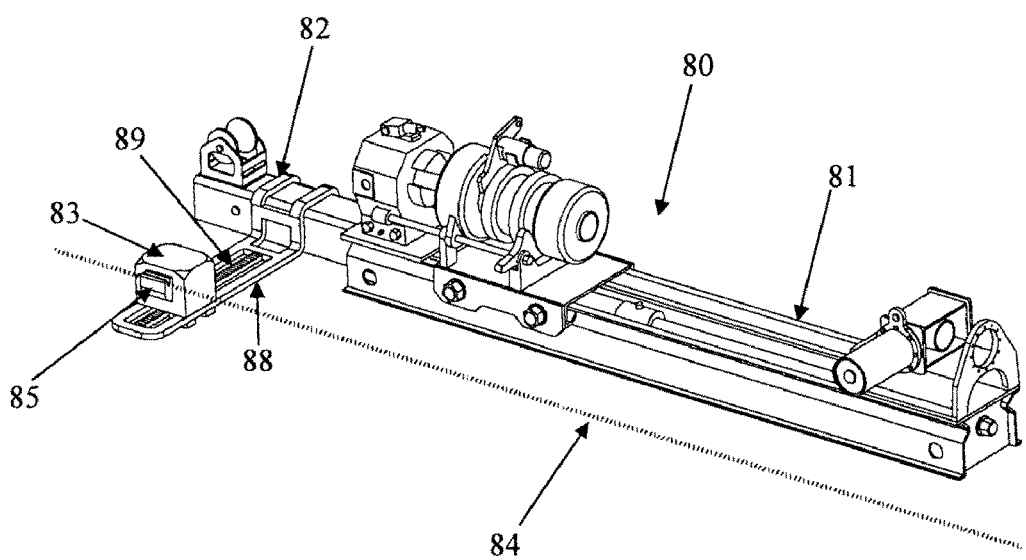
FIG. 13 is a further schematic perspective view of a drilling rig with the device according to a preferred embodiment attached and aligned.
Figure 14A:
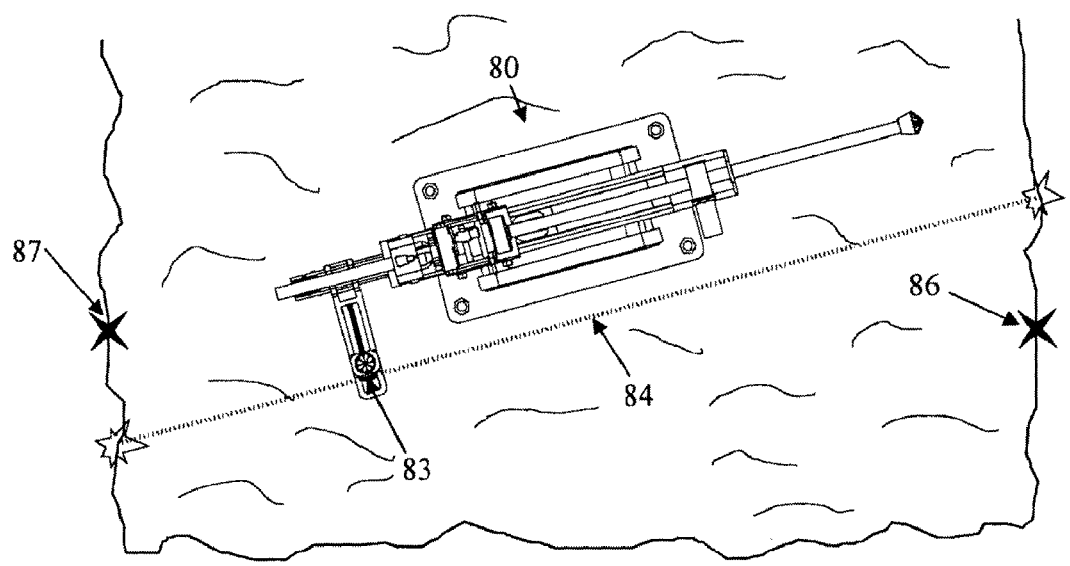
FIG. 14a is a schematic view of a drill rig from above with the device according to a preferred embodiment attached.
Figure 14B:
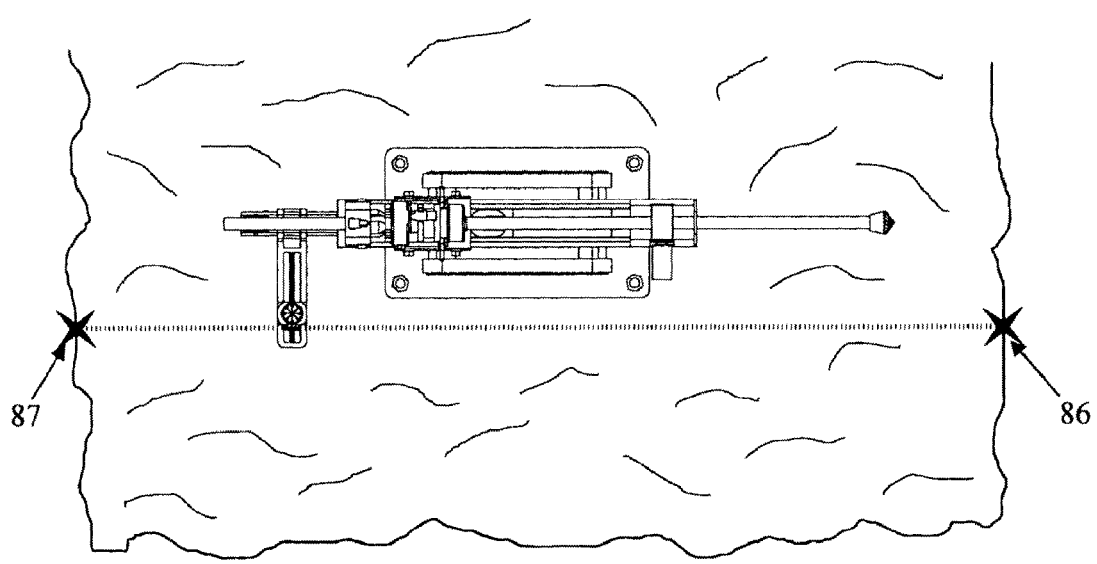
FIG. 14b is a further schematic view of a drill rig from above with the device according to a preferred embodiment attached and aligned.

A further embodiment of the present invention is illustrated in FIG. 13 showing a drilling rig 80 fitted with a cradle 82 at the rear of the boom 81. The cradle 82 in turn holds a removable laser unit 83 comprising a rotating or static laser 85 capable of projecting a laser beam 84 to the extremities of the front and rear walls of the tunnel. The unit 83 will also contain a clinometer to take pitch readings and a device that will capture the yaw of the rig. The laser unit is set up so that the beam emitted runs parallel to the drill shaft. This means that when the drill rig 80 is moved to a position where the laser beam is aligned to the front marker tag 86 and rear marker tag 87 on the front and rear walls, as illustrated in FIG. 14A, the drill rig is in the correct alignment for drilling, illustrated in FIG. 14B.

The cradle 82 is fitted with a removable extender section 88, which can be stored safely when not in use. It also has a geared rack 89 incorporated to allow the head unit 83 to be moved in and out remotely. This function is to allow the fine-tuning which may be required to compensate for the movement of the rig 80 relative to the marker points.

If on the rare occasion the drill rig 80 isn't able to be positioned close enough to the marker points for the laser beams to reach the markers then alignment can be approximated by eye and the fine-tuning can be done by measuring the distances between the laser beam 84 and the tag at the front 86 and back 87 markers.

The clamp on cradle 82 has adjustable fixing points so it can be adapted to the majority of drill rigs used in this application.

Figure 15:
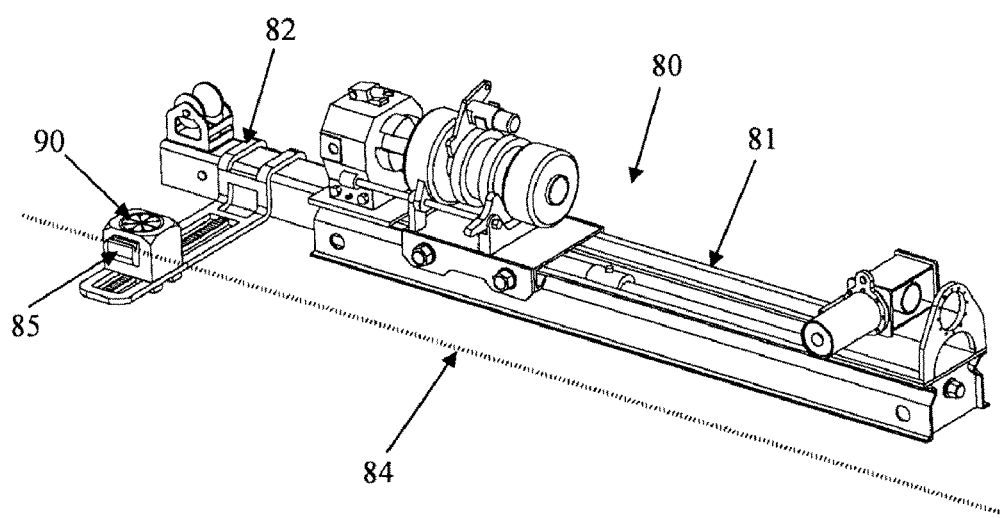
FIG. 15 is a further schematic perspective view of a drilling rig with the device according to a preferred embodiment attached and aligned.

The preferred embodiment illustrated in FIG. 15 is another variation of the present invention that allows the alignment of the drilling rig to the marker points without having to implicitly align the laser beams to the marker tags.

This embodiment has all of the functionality of the embodiment illustrated in FIG. 13 but adds a bearing device such as a compass or gyrocompass that allows the operator to align the rig 80 according to a bearing taken from the site plans or by repeating a bearing from a remote reading obtained by aligning the compass to the front 86 and back 87 markers. A laser/compass unit 90 including both a laser unit and a compass or bearing unit is provided.

This embodiment does not require an extended support system or the ability to move the laser/compass unit 90 relative to the rig 80 (as used in the previous embodiment) as there is no need to align the laser to the marker points when the unit is fixed to the rig.

In use a remote reading is translated to or taken from the compass from the alignment of the compass to the marker points on the front and back walls, using a laser beam 84. This reading can be translated to the rig 80 by taking the laser/compass unit 90 with the reading on it and fixing it to the drilling rig 80. The actual reading can be translated to the rig or a marker can be used to capture the zero point on the compass when aligned to the marker tags and then the rig can be aligned to the zero point defined by that marker.

Figure 16A:
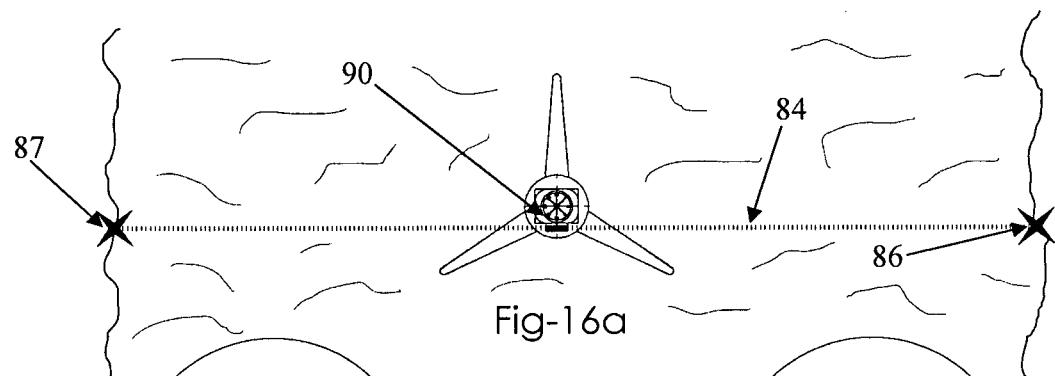
FIG. 16a is a schematic view from above of a laser/compass unit mounted on a tripod according to a preferred embodiment.
Figure 16C:
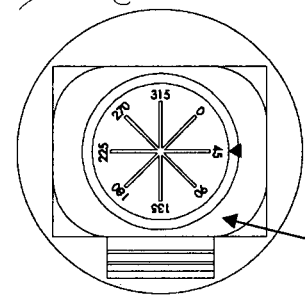
FIG. 16c is a schematic view from above of a laser compass unit.
Figure 16D:
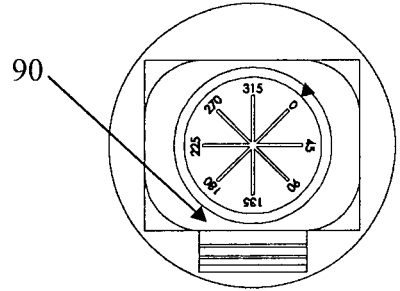
FIG. 16d is a schematic view from above of a laser compass unit.

For example, as illustrated in FIG. 16A, a laser/compass unit 90 is mounted on a tripod and using the laser being aligned with the front and rear markers, a true burying from the tripod mounted laser/compass unit 90 reads 45[deg]. And how to dial of the compass of the preferred embodiment can then be rotated to read 0[deg.].

Figure 16B:
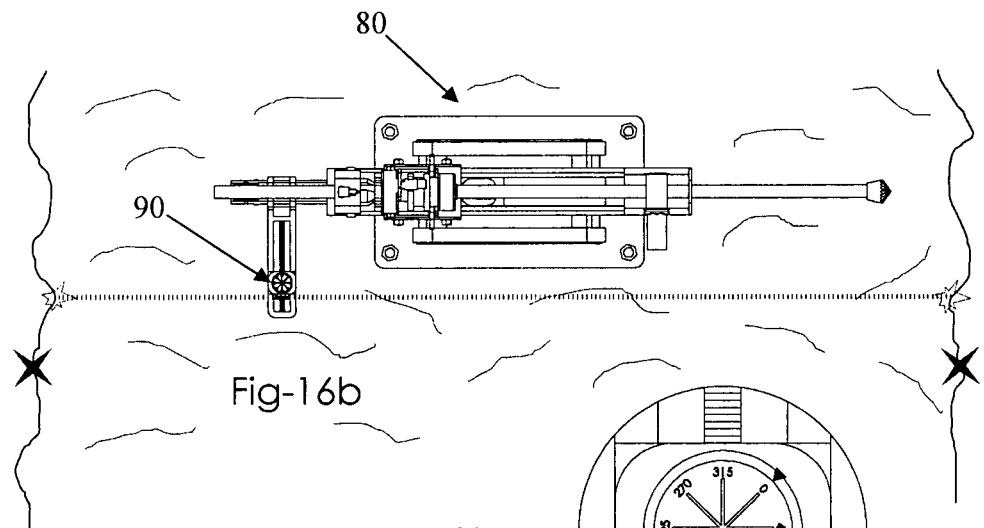
FIG. 16b is a schematic view from above of a drilling rig with the device according to a preferred embodiment attached and aligned.
Figure 16E:
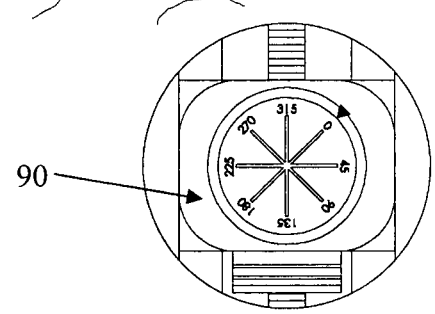
FIG. 16e is a schematic view from above of a laser compass unit.

As illustrated in FIG. 16B, the laser/compass unit 90 can then be transferred to the cradle 82 mounted on the drilling rig 80 entity drill rig is then rotated until the compass again shows the zero reading. The drill rig 80 will be parallel to the market points when the compass read zero as illustrated in FIG. 16E.

If the readings are to be taken from site plans then the compass should be calibrated to the site plans before any readings can be translated to the drilling rig. This would need to compensate for specific site grids that may be a fixed number of degrees off true north. In these situations the bearing may be a simple translation of the bearing dictated on the plans to the rig. Alternatively a true north reading can be translated directly to the rig with any site anomalies being accounted for in the bearing.

In order for the operator of the drilling rig to align the drilling shaft with the marker points he/she estimates the correct proximity to the front marker and then rotates the rig until the required bearing is met. The bearing devices used will need to be impervious to any external influences that may affect its accuracy, such as magnetic effects which are typically present in underground mines.

The compass, gyrocompass or any type of bearing reader/repeater and inclination reader (clinometer) can also be used to align any type of surface drill rig or any type of drilling equipment that needs aligning. Alternatively a true north bearing gyrocompass can be used to align the drill rig or equipment to the required azimuth and a clinometer can be used to determine the depth, or the gyrocompass can be set to a particular mine grid depending on the user's requirements that can be fixed to the mast of the rig or side or any part of the rig or equipment.

It is intended that the mobile units are stored safely and transported to the rig when required.

In the present specification and claims (if any), the word "comprising" and its derivatives including "comprises" and "comprise" include each of the stated integers but does not exclude the inclusion of one or more further integers.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more combinations.

Although a few embodiments of the present invention have been shown and described, it would be appreciated by those skilled in the art that changes may be made in this embodiment without departing from the principles and spirit of the invention, the scope of which is defined in the claims and their equivalents.

The invention claimed is:

1. A laser alignment device for use with a drill rig having an elongate drill rod, the laser alignment device including a head unit having at least a pair of laser emitting devices mounted independently to one another thereon, each of the laser devices movable in one plane only and oriented in substantially opposite directions to one another to define an alignment plane, an attachment means to attach the head unit to a drill rig and a length adjustable assembly to adjust the separation distance between the head unit and the drill rod, wherein the alignment device is used to align at least the azimuth of the drill rod relative to survey marks utilizing the alignment plane.

2. A laser alignment device as claimed in claim 1 wherein the alignment of the drill rig takes place prior to securing the drilling rig in position to drill the hole.

3. A laser alignment device as claimed in claim 1 wherein the head unit mounts the pair of opposed laser pointing devices in a removable manner.

4. A laser alignment device as claimed in claim 3 wherein each of the laser pointing devices is held by a laser holding means.

5. A laser alignment device as claimed in claim 4 wherein the laser holding means are attached relative to one another.

6. A laser alignment device as claimed in claim 4 wherein laser pointing devices are attached to one another and are movable relative to one another via a pivot.

7. A laser alignment device as claimed in claim 4 wherein the laser holding means are sandwiched between a backing plate and a front plate.

8. A laser alignment device as claimed in claim 7 wherein each laser holding means is provided with a finger tab extending at an angle to the holding means.

9. A laser alignment device as claimed in claim 8 wherein a pair or arcuate openings is provided through the front plate through which the finger tabs extend.

10. A laser alignment device according to claim 3 wherein the laser pointing devices are attached to the head unit by a magnetic attachment.

11. A laser alignment device according to claim 1 wherein the attachment means includes a length adjustable arm associated with the head unit and a foot portion at an opposite end of the arm to the head unit.

12. A laser alignment device according to claim 1 including a remote-controlled alignment mechanism including a driving mechanism to adjust each of the laser pointing devices and where a telescopic arm can be extended and retracted remotely.

13. A laser alignment device according to claim 1 including notification means to notify the user when the laser pointing devices are correctly aligned.

14. A laser alignment device as claimed in claim 13 wherein the notification means includes a visual notification.

15. A laser alignment device as claimed in claim 13 wherein the notification means includes an aural notification.

16. A laser alignment device as claimed in claim 13 wherein a reflective strip is placed on the survey marker and when the laser beam is correctly aligned, the laser beam will bounce off the reflective strip and back to a sensor provided on the head unit which activates the notification means.

17. A laser alignment device according to claim 1 including a digital inclinometer attached to the device to allow the correct elevation of the drill rig to be quickly determined, and together with the two laser pointing devices to determine the azimuth, the drill rig is correctly orientated.

18. A laser alignment device as claimed in claim 1 wherein the device is used to adjust elevation of the drill rod.

19. A drill rig having an elongate drill rod, and a laser alignment device according to claim 1.

20. A drill rig according to claim 19 wherein the laser alignment device is removeably attached to a feed rail and is removed prior to commencement of the drilling.

21. A drill rig according to claim 19 wherein the laser alignment device is attached to the drill rig magnetically.

22. A laser alignment device for use with a drill rig having an elongate drill rod, the laser alignment device including a head unit having at least one laser emitting device including one rotating laser device movable in one plane only substantially parallel to the drill rod such that the rotating laser device defines an alignment plane through rotation, an attachment means to attach the head unit to a drill rig and an adjustable assembly to adjust the positioning of the head unit relative to the drill rod, wherein the alignment device is used to align at least the azimuth of the drill rod relative to survey marks utilizing the alignment plane.

23. A laser alignment device as claimed in claim 22 wherein at least one laser emitting device is mounted for rotation.

24. A laser alignment device as claimed in claim 22 further including an inclinometer to ensure that the drill rod has the correct inclination.

25. A laser alignment device for use with a drill rig having an elongate drill rod, the laser alignment device including a head unit having at least one laser emitting device including one rotating laser device movable in one plane only such that the rotating laser device defines an alignment plane through rotation, an attachment means to attach the head unit to a drill rig and an adjustable assembly to adjust the positioning of the head unit relative to the drill rod, wherein the alignment plane is substantially parallel to the drill rod and the alignment device is used to align at least the yaw of the drill rod relative to survey marks utilizing the alignment plane.

* * * * *